Feb. 4, 1947.  F. B. ARPS  2,415,156
TOGGLE JOINT LOCK FOR DUMP SCOOPS AND THE LIKE
Filed Oct. 26, 1945  2 Sheets—Sheet 1

INVENTOR.
FREDERICK B. ARPS
BY  *A. S. Krob*
ATTORNEY

Feb. 4, 1947.  F. B. ARPS  2,415,156
TOGGLE JOINT LOCK FOR DUMP SCOOPS AND THE LIKE
Filed Oct. 26, 1945  2 Sheets-Sheet 2

INVENTOR.
FREDERICK B. ARPS
BY A. S. Krob
ATTORNEY

Patented Feb. 4, 1947

2,415,156

UNITED STATES PATENT OFFICE 2,415,156

TOGGLE JOINT LOCK FOR DUMP SCOOPS AND THE LIKE

Frederick B. Arps, New Holstein, Wis.

Application October 26, 1945, Serial No. 624,831

4 Claims. (Cl. 37—124)

The present invention relates to a dump scoop or scraper attachment for tractors, the tractor having preferably a hydraulic lift with which to raise and lower the scoop or scraper.

The principal object of the present invention is to provide a locking and releasing means for a toggle joint as shown and described in Patent #2,352,466, June 27, 1944, and application Serial #554,657, filed September 18, 1944, maturing in Patent Number 2,398,991, April 23, 1946, F. B. Arps.

An object of the present invention is to provide a simple, easily manufactured at low cost toggle joint locking means, and a device which is effective and easily operated.

In devices of the character when loading the scoop or moving banks of snow, if a locking means is not provided, dirt and snow may accumulate high enough to trip the toggle joint. It is therefor an object of the present invention to prevent this accidental tripping and at the same time provide a toggle joint wherein it is not necessary for the middle pivot to be exactly at or below the plane of the front and rear pivots of the toggle joint.

It is also an object of the present invention to provide means whereby if the toggle joint stops slightly short of a locked position the operator may push on the tripping link and force the toggle and its locking means to a loading and locked position.

Another object of the present invention is to provide a locking device, which may be used to assist the scoop or scraper in its first dumping movement by an additional pull on the control link by the operator.

To these and other useful ends my invention consists of parts, combinations of parts or their equivalents and mode of operation as hereinafter described and claimed and shown in the accompanying drawings in which:

Figure 1:
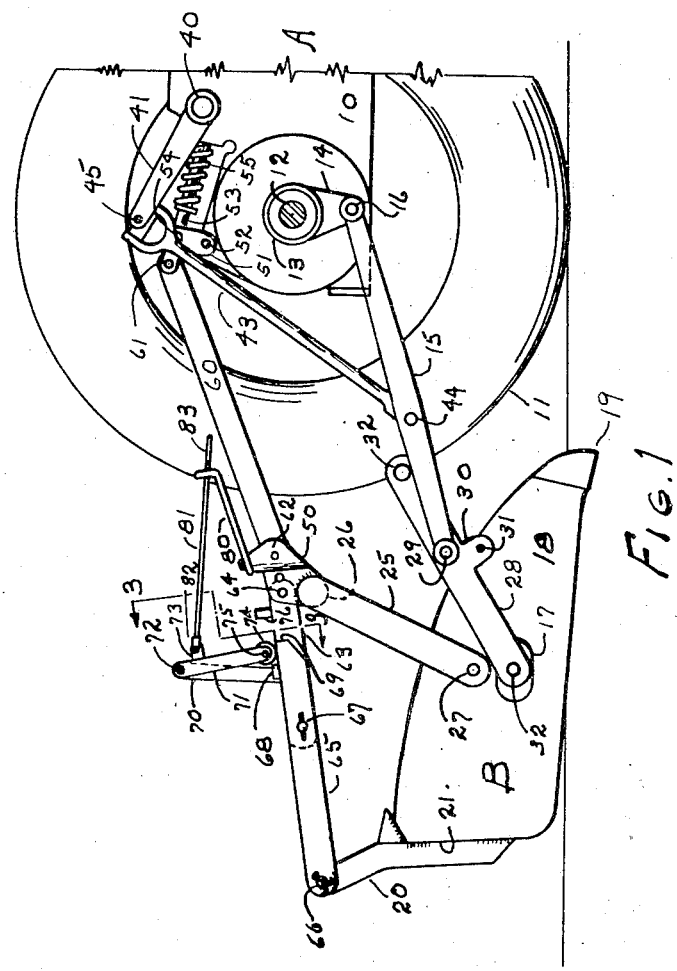
Fig. 1 is a side elevational view of my improved locking device wherein the scoop is shown in its loading position.

I have shown my improved toggle joint locking means as used on the design shown in Serial #554,657, hereinbefore mentioned. Although clearly my locking device may be used on any other device of the character using a toggle joint of the character.

In the figures reference character A designates the tractor to which the device is attached and reference character B designates in its entirety the scoop member.

The frame of the tractor is designated by reference numeral 10, having rear carrying wheels 11—11 being secured to axle members 12—12, which extend to the differential in the housing of the tractor through axle housing 13—13. Each housing 13 has a depending bracket 14 to which the front end of draw-bars 15—15 are pivotally mounted as at 16. Strengthening plates 17 are secured to the side walls 18 of scoop B. The scoop is provided with a suitable cutting edge 19 at its forward end and a bracket 20 on its rear end 21. Member 20 at its upper end preferably extends slightly rearwardly and a distance above member 21 as illustrated in Figures 1 and 2.

I provide an inverted U shaped member consisting of side members 25, the upper ends being connected together by means of a tube 26 preferably by electric welding. The lower ends of members 25 are pivotally secured to members 18 as at 27. The rear ends of draw-bars 15 are pivotally secured to extension links 28—28 as at 29.

Pivots 29 are positioned about as shown in the figures and slightly forward of extensions 30. These extensions each have outwardly extending pins 31 which lie in the path of members 15 so as to limit the movement of member 28 on pivot 29 relative to members 15 when the scoop is in a lifted position.

Figure 2:
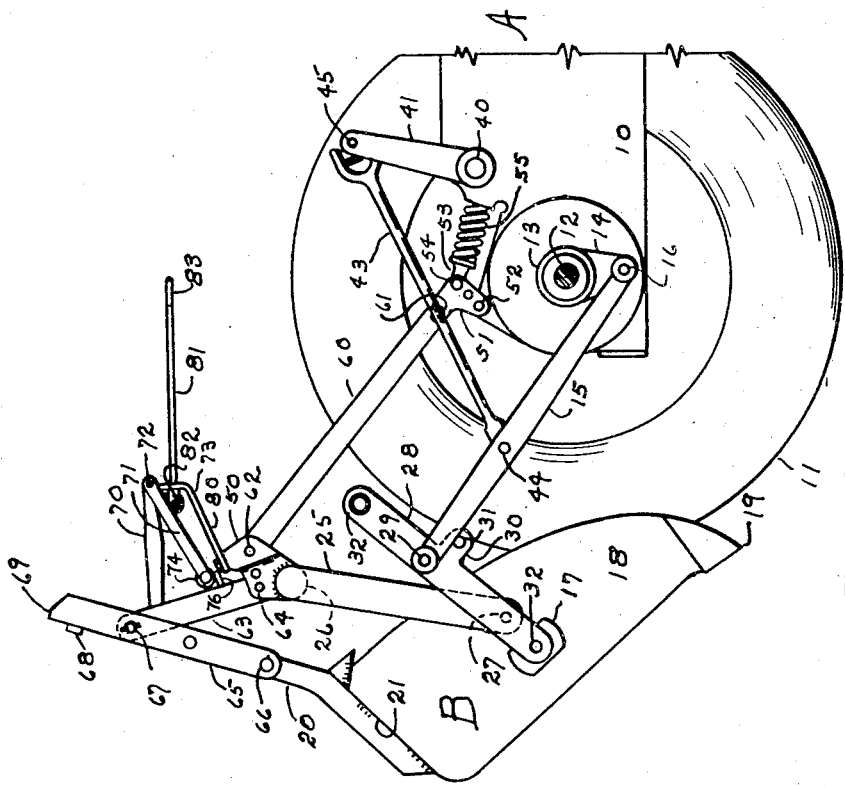
Fig. 2 is a side elevational view as in Figure 1, except with the scoop in its dumping position.
Figure 3:
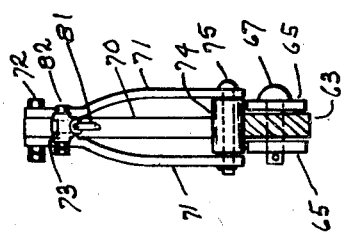
Fig. 3 is a view taken on line 3—3 of Figure 1.

On the upper ends of members 28, I provide outwardly extending pins 32 which lie in the path of draw-bars 15 and contact these members when the scoop is in a loading position as illustrated in Figure 1. Thus member 28 is limited in its movement on pivot 29 in both directions, the objects of which will hereinafter appear. Members 28 are at their rear ends pivoted to members 17 as at 32.

Tractor A is provided with a hydraulic power lift which is preferably mounted within housing 10, having a shaft 40 which protrudes through opposite sides of the housing. I mount levers 41—41 (one not shown) on the ends of shaft 40 and form suitable connections between the free ends of levers 41 and draw-bars 15 by means of links 43 as at 44 and 45. Thus the power lift may be used for raising and lowering the rear ends of draw-bars 15 and for raising and lowering the scoop or scraper.

On the upper side of tube 26 and preferably at the center thereof I mount a bracket 50. I pivotally mount a bell crank 51 on the engine housing 10 as at 52. The other end of the bell crank 51 is pivoted to a flanged link 53 as at 54. A spring 55 is mounted on link 53, the front end of link 53 slidably extending into member 10, so as to urge member 51 rearwardly to a position determined by a stop (not shown).

The rear end of member 51 is pivotally connected to a link 60 as at 61. Link 60 at its rear end is pivoted to bracket 50 as at 62. I provide a toggle joint between members 50 and 20 as follows:

The front link 63 of the toggle joint is pivoted at its front end to member 50 as at 64. I provide a pair of links 65 which at their rear ends straddle member 20 and are pivoted to this member as at 66. Members 65 lie on opposite sides of member 63 and are pivoted thereto as at 67. A block 68 forms a rigid connection between members 65 so a free movement of member 63 is provided. Members 65 terminate as at 69. I secure a post 70, preferably by electric welding, to member 63 in the position shown in the figures.

A pair of links 71 is freely pivoted on opposite sides of member 70 as at 72. Members 71 have forwardly extending lugs 73 and are bent so as to be wider between their lower ends than the over all width of members 65. Between these lower ends I rotatably mount a roller 74 as at 75. Members 71 are adapted to hold roller 74 so it clears the top of member 63. A block 76 is secured to the top of member 63, in the position shown in the figures, as a stop for roller 74 when the roller is far enough forward to permit the front ends of members 65 to swing upwardly.

On the top of member 50 I mount a bracket 80, the front end of which is adapted to loosely embrace a link 81, this link being pivotally secured to members 73 as at 82, the forward end of link 81 having a hand hold 83. Thus it will be seen that Figure 1 illustrates a loading position wherein roller 74 lies on the top of the front ends of members 65, so that when in this position the toggle joint cannot be accidentally tripped when the scoop is being loaded or otherwise.

When it is desired to trip the scoop so it can assume the position shown in Figure 2, a pull on hand piece 83 will move the roller forward and permit the scoop to tilt forwardly and release its load as clearly illustrated in Figure 2. After the load has been released and when it is desired to reload the scoop it is lowered to the position shown in Figure 1. Normally the scoop will swing back to its loading position when lowered to a loading position at which time the weight of members 71, 73, 74 and 81 will cause the roller to assume the position shown in Figure 1 by gravity and automatically lock the toggle joint.

If however the scoop and toggle joint do not quite assume the position shown in Figure 1, pressure on hand hold 83 will complete the operation and lock the toggle. It will also be noted that when the operator pulls on hand hold 83 the tendency is to cause link 63 to swing upward on pivot 64, thus to start the toggle joint and scoop toward dumping position.

Thus it will be seen that when the scoop is in the position shown in Figure 1, members 32 will be lying on members 15 and members 15 and 28 will act similar to a straight through connection between 16 and 32 for pulling the scoop into the material for loading. When it is desired to lift the scoop, members 15 and 28 will first assume the position as in Figure 2 resulting in lifting the front end of the scoop a short distance and tilting it back so as to retain most of the dirt in the scoop.

When a scoop is lifted straight up as in other devices a considerable quantity of dirt will roll off the scoop. After pins 31 meet draw-bars 15 further movement of the power lift will lift the scoop which remains in its tilted back position. When it is desired to dump the scoop then the operator pulls on member 83 as hereinbefore described. When the scoop is lowered its contact with the ground causes the toggle joint to assume the position as in Figure 1 and the locking device will be caused to engage the front ends of members 65.

Having thus shown and described my invention I claim:

1. In combination with a tractor having a power lift, draw-bars having their forward ends hingedly connected to opposite sides of the tractor, an operating connection between said draw-bars and power lift, an earth engaging member hingedly connected to the rear ends of said draw-bars, means connecting the tractor to said earth engaging means for holding the earth engaging means in an operating position, a toggle joint in said means having a stop whereby the toggle joint at its center may be moved downward to its extended position, the rear end of said toggle joint comprising two bars, the forward ends of which straddle the rear end of the front member of the toggle joint, a post secured to the top of the front end of said toggle joint and a short distance in rear of the front ends of the rear members of the toggle joint, a pair of straps hingedly mounted at their upper ends to the upper end of said post, a roller positioned between the lower ends of said straps adapted to pass freely over the upper edge of the front end of the toggle joint and over the forwardly extending ends of the rear portions of the toggle joint, a rod secured to said straps a distance below the hinge thereof and extending forwardly to within reach of the operator, whereby the operator may by pulling the rod, release the toggle joint and assist the earth engaging means in its forward tilting movement, said straps and roller being adapted to move rearwardly by gravity for locking the toggle joint and whereby the operator may by pushing on the rod force the toggle joint toward its locked position and move said roller to its locked position.

2. In combination with a tractor having a power lift, draw-bars hingedly connected at their front ends to opposite sides of the tractor, a scoop hingedly connected at opposite sides to the rear ends of the draw-bars, an operating connection between said power lift and draw-bars, means a distance above the draw-bars connecting the tractor to the rear end of the rear upper corner of the scoop, said means having a toggle joint with means adapted to hold the scoop in a loading position when in its extended position and adapted to permit the scoop to tilt forward on its connection to the draw-bars when the toggle joint is broken, the front end of the rear member of the toggle joint extending forward a distance from the hinge thereof, an upwardly extending post secured to the forward end of the toggle joint, links pivoted to the top of said post and having rotatably mounted between the bottom ends thereof a roller positioned to move freely over the forward end of the toggle joint and over the forward ends of the rear members thereof, to hold the scoop in a loading and transporting position, means associated with said depending links extending forward within reach of the operator, whereby a pull on said last means by the operator will release the toggle and permit the scoop to tilt forward for dumping.

3. In combination with a tractor having a power lift, draw-bars having their forward ends hingedly connected to opposite sides of the tractor, an operating connection between said draw-bars and power lift, an earth engaging means hingedly connected to the rear ends of said draw-bars, a connection between the tractor and said earth engaging means positioned a distance above said draw-bars adapted to hold the earth engaging means in an operating position, a toggle joint in said connection having a stop adapted to hold the toggle joint in its extended position, a post secured to the upper side of one of said toggle joint members having hinged to the upper end thereof a depending link with means on its lower end adapted to engage and hold the toggle joint in its extended position, means secured to said depending member a distance below the hinge thereof and extending forward to within reach of the operator, whereby the operator may by pulling on said last means release the toggle joint and permit the earth engaging means to tip forward.

4. A device as recited in claim 3 including, said depending member being positioned to thereby normally move to its locking position by gravity.

FREDERICK B. ARPS.

REFERENCES CITED

The following references are of record in the file of this patent:

UNITED STATES PATENTS

| Number | Name | Date |
|---|---|---|
| 2,352,466 | Arps | June 27, 1944 |
| 1,557,402 | Bateson | Oct. 13, 1925 |

FOREIGN PATENTS

| Number | Country | Date |
|---|---|---|
| 511,140 | German | Oct. 27, 1930 |